United States Patent
Hashimoto

(10) Patent No.: US 11,741,035 B2
(45) Date of Patent: Aug. 29, 2023

(54) CIRCUIT DEVICE AND ELECTRONIC APPARATUS

(71) Applicant: Seiko Epson Corporation, Tokyo (JP)

(72) Inventor: Keisuke Hashimoto, Chino (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/679,286

(22) Filed: Feb. 24, 2022

(65) Prior Publication Data

US 2022/0269628 A1 Aug. 25, 2022

(30) Foreign Application Priority Data

Feb. 25, 2021 (JP) ................................ 2021-028266

(51) Int. Cl.
   *G06F 13/36*  (2006.01)
   *G06F 13/362*  (2006.01)
   *G06F 13/42*  (2006.01)

(52) U.S. Cl.
   CPC ........ *G06F 13/362* (2013.01); *G06F 13/4221* (2013.01)

(58) Field of Classification Search
   CPC ..... G06F 13/362; G06F 13/42; G06F 13/4221
   See application file for complete search history.

(56) References Cited

U.S. PATENT DOCUMENTS

| 8,209,509 | B2* | 6/2012 | Renno | G06F 12/1441 711/163 |
| 10,972,449 | B1* | 4/2021 | Levin | G06F 21/606 |
| 2003/0172214 | A1 | 9/2003 | Moyer et al. | |
| 2008/0178024 | A1* | 7/2008 | Kamegawa | G06F 1/3203 713/340 |
| 2009/0085626 | A1* | 4/2009 | Ueno | G06F 13/362 327/202 |
| 2014/0281081 | A1* | 9/2014 | Lunadier | G06F 13/4022 710/110 |
| 2016/0275028 | A1* | 9/2016 | Ishikawa | G06F 13/4068 |
| 2016/0277013 | A1* | 9/2016 | Ishikawa | H03K 5/1506 |
| 2019/0196998 | A1* | 6/2019 | Koike | G06F 13/372 |

FOREIGN PATENT DOCUMENTS

| CN | 1639666 A | 7/2005 |
| JP | 2019-160191 A | 9/2019 |

* cited by examiner

*Primary Examiner* — Henry Tsai
*Assistant Examiner* — Christopher A Daley
(74) *Attorney, Agent, or Firm* — Harness, Dickey & Pierce, P.L.C.

(57) ABSTRACT

A circuit device includes a bus, a plurality of master circuits that are coupled to the bus and are bus masters in the bus, and a plurality of slave circuits that are coupled to the plurality of master circuits via the bus and are bus slaves in the bus. Access authority to the bus slaves is set for the plurality of master circuits, and permission setting of read access or write access from the bus masters is performed for the plurality of slave circuits. The plurality of master circuits determine whether the plurality of slave circuits are accessible based on the access authority and the permission setting.

16 Claims, 10 Drawing Sheets

FIG. 4

| | TARGET MASTER | PRESENCE OR ABSENCE OF ACCESS AUTHORITY |
|---|---|---|
| ACCESS AUTHORITY SETTING | PROCESSOR | YES |
| | DEBUG CIRCUIT | NO |
| | DMA CONTROLLER | YES |
| | EXTERNAL BUS INTERFACE | NO |

FIG. 5

| | TARGET AREA | PERMISSION OF ACCESS HAVING NO AUTHORITY | |
|---|---|---|---|
| | | READ | WRITE |
| ACCESS PERMISSION SETTING | MEMORY STORAGE AREA AR1 | PERMITTED | PERMITTED |
| | MEMORY STORAGE AREA AR2 | PERMITTED | PERMITTED |
| | MEMORY STORAGE AREA AR3 | PROHIBITED | PROHIBITED |
| | ⋮ | ⋮ | ⋮ |
| | MEMORY STORAGE AREA AR128 | PROHIBITED | PERMITTED |
| | SRAM | PERMITTED | PROHIBITED |
| | PERIPHERAL CIRCUIT PA | PERMITTED | PERMITTED |
| | PERIPHERAL CIRCUIT PB | PROHIBITED | PERMITTED |
| | PERIPHERAL CIRCUIT PC | PROHIBITED | PROHIBITED |
| | ⋮ | ⋮ | ⋮ |
| | PERIPHERAL CIRCUIT PZ | PERMITTED | PERMITTED |

FIG. 6

| | PROCESSOR | | DEBUG CIRCUIT | | DMA CONTROLLER | | EXTERNAL BUS INTERFACE | |
|---|---|---|---|---|---|---|---|---|
| | READ | WRITE | READ | WRITE | READ | WRITE | READ | WRITE |
| SRAM | ○ | ○ | ○ | × | ○ | ○ | ○ | × |
| PERIPHERAL CIRCUIT PA | ○ | ○ | ○ | ○ | ○ | ○ | ○ | ○ |
| PERIPHERAL CIRCUIT PB | ○ | ○ | × | ○ | ○ | ○ | × | ○ |
| PERIPHERAL CIRCUIT PC | ○ | ○ | × | × | ○ | ○ | × | × |
| ... | | | | | | | | |
| PERIPHERAL CIRCUIT PZ | ○ | ○ | ○ | ○ | ○ | ○ | ○ | ○ |

FIG. 7

| ITEM NAME | ITEM VALUE |
|---|---|
| ACCESS TYPE | IDLE STATE/ACCESS STATE |
| ACCESS ADDRESS | 0x0000_0000~0xFFFF_FFFF |
| WRITE/READ | READ/WRITE |
| WRITE DATA | 0x0000_0000~0xFFFF_FFFF |
| ACCESS SIZE | BYTE/HALF WORD/WORD |
| ACCESS AUTHORITY | COMMAND BUS/DATA BUS (WITH AUTHORITY)/DATA BUS (WITHOUT AUTHORITY) |

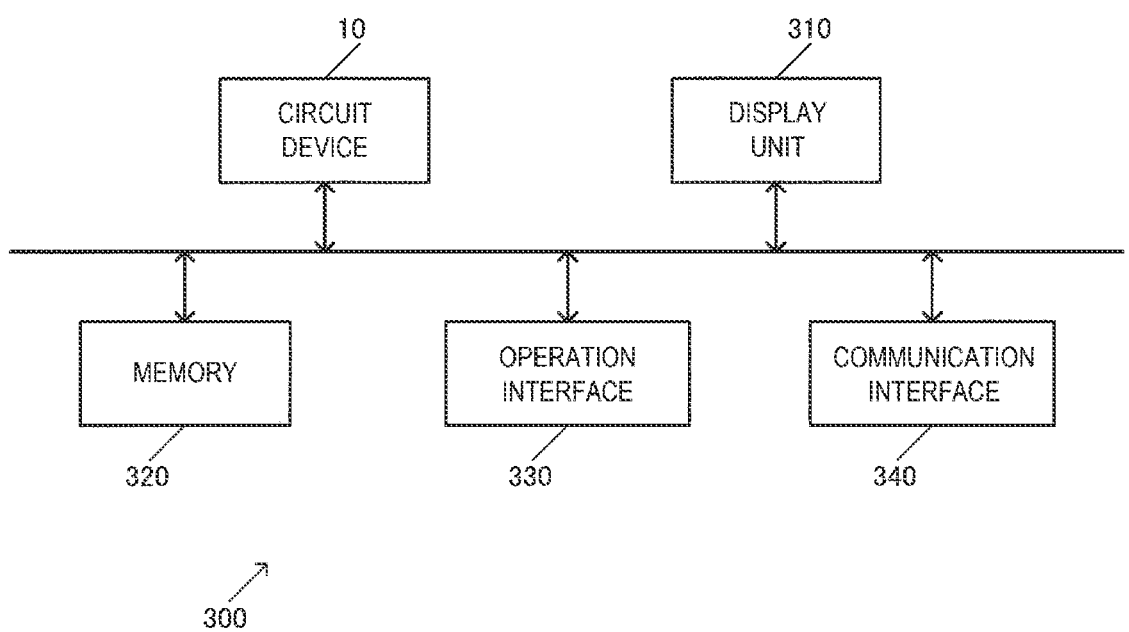

CIRCUIT DEVICE AND ELECTRONIC APPARATUS

The present application is based on, and claims priority from JP Application Serial Number 2021-028266, filed Feb. 25, 2021, the disclosure of which is hereby incorporated by reference herein in its entirety.

BACKGROUND

1. Technical Field

The present disclosure relates to a circuit device and an electronic apparatus.

2. Related Art

In a circuit device such as a microcomputer, important information such as confidential information may be stored in a memory provided in the circuit device. It is not desirable that such confidential information or the like is read from the circuit device by access from an external device. Examples of related-art techniques of protecting the confidential information or the like include a technique disclosed in JP-A-2019-160191, for example. In JP-A-2019-160191, a storage unit stores specific data in a predetermined data area. An execution unit receives a predetermined command for accessing the specific data, determines whether the received predetermined command is executable based on a security state of the predetermined data area, and executes processing of the predetermined command when determining that the predetermined command is executable.

In JP-A-2019-160191, whether the specific data is accessible is determined by determining the predetermined command from an external device, and thus access authority setting is complicated. In terms of security, erroneous access is likely to occur and thus security for important information may be low.

SUMMARY

An aspect of the present disclosure relates to a circuit device. The circuit device includes: a bus; a plurality of master circuits that are coupled to the bus and are bus masters in the bus; and a plurality of slave circuits that are coupled to the plurality of master circuits via the bus and are bus slaves in the bus. Access authority to the bus slaves is set for the plurality of master circuits, permission setting of read access or write access from the bus masters is performed for the plurality of slave circuits, and the plurality of master circuits determine whether the plurality of slave circuits are accessible based on the access authority and the permission setting.

Another aspect of the present disclosure relates to an electronic apparatus including the circuit device described above.

BRIEF DESCRIPTION OF THE DRAWINGS

FIG. 4 is a diagram of access authority setting.

FIG. 5 is a diagram of access permission setting.

FIG. 6 shows an application example of a method according to the embodiment.

FIG. 7 is a diagram of bus access information.

FIG. 11 shows a configuration example of an electronic apparatus according to the embodiment.

DESCRIPTION OF EXEMPLARY EMBODIMENTS

Hereinafter, a preferred embodiment of the present disclosure will be described in detail. The embodiment to be described below does not unduly limit contents of the present disclosure described in the claims, and all configurations described in the embodiment are not necessarily essential as a solution to the problem of the present disclosure.

1. Circuit Device

Figure 1:
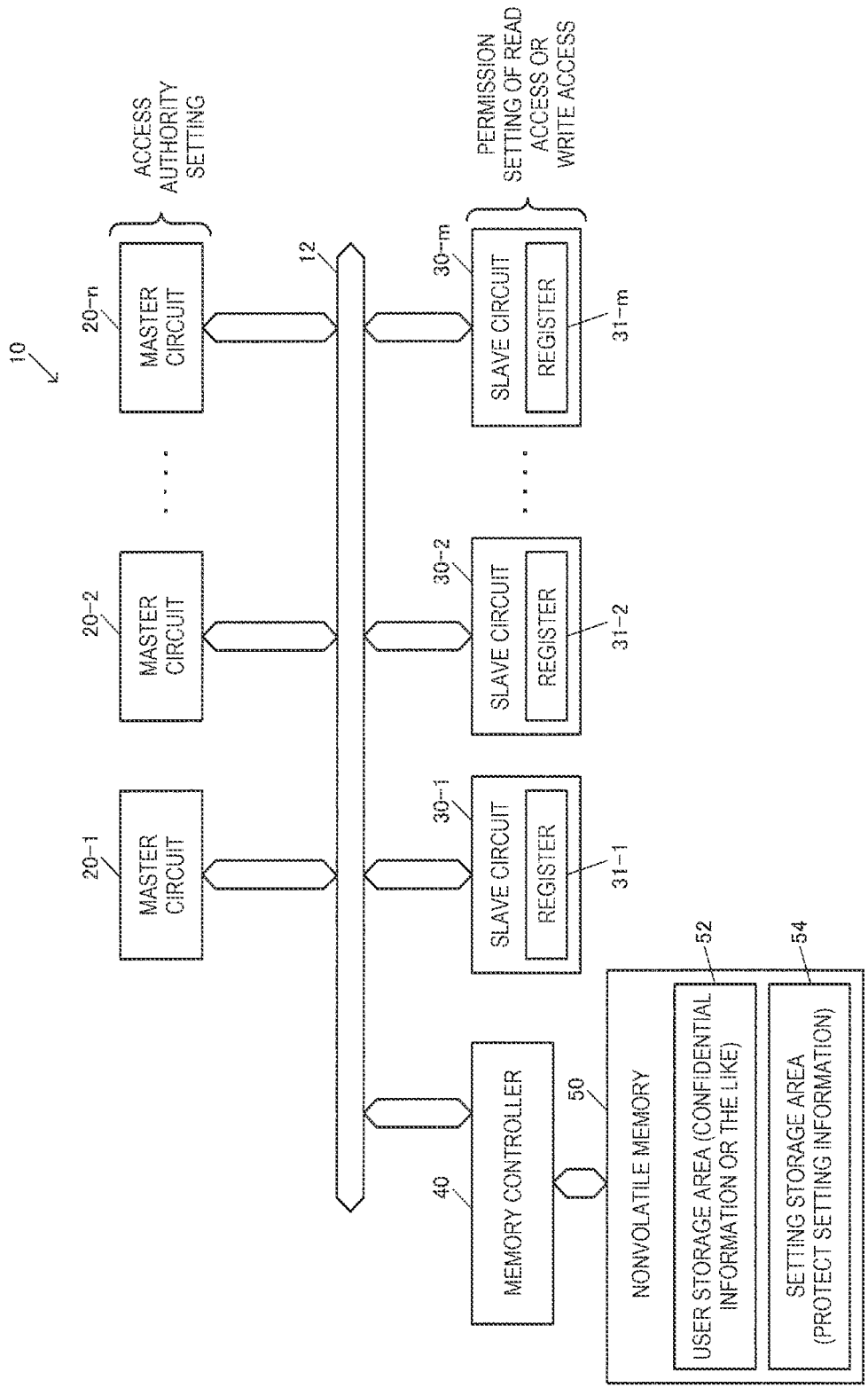
FIG. 1 shows a configuration example of a circuit device according to an embodiment.

FIG. 1 shows a configuration example of a circuit device 10 of the embodiment. The circuit device 10 of the embodiment includes a bus 12, a plurality of master circuits 20-1 to 20-$n$ that are coupled to the bus 12 and are bus masters in the bus 12, and a plurality of slave circuits 30-1 to 30-$m$ that are coupled to the plurality of master circuits 20-1 to 20-$n$ via the bus 12 and are bus slaves in the bus 12. Here, n and m are integers of 2 or more. The circuit device 10 may include a memory controller 40 and a nonvolatile memory 50.

The bus master performs transfer control of the bus 12. In a master/slave model, the bus master obtains a right to use a bus and specifies a target device to perform data transfer. In order to prevent data collision or the like in the bus 12, for example, the device is divided into a bus master and a bus slave, and the bus slave can input and output data only when instructed from the bus master. In FIG. 1, the master circuits 20-1 to 20-$n$ are circuits that operate as bus masters, and the slave circuits 30-1 to 30-$m$ are circuits that operate as bus slaves.

The memory controller 40 controls the nonvolatile memory 50. For example, the memory controller 40 performs read control and write control of the nonvolatile memory 50. The memory controller 40 is a slave circuit, for example, and operates as a bus slave.

The nonvolatile memory 50 retains information storage even when no electric power is supplied. For example, the nonvolatile memory 50 can rewrite information while retaining the information storage even when no electric power is supplied. The nonvolatile memory 50 stores various kinds of information necessary for an operation of the circuit device 10 and the like.

For example, the nonvolatile memory 50 is an electrically erasable programmable read-only memory (EEPROM) implemented by a floating gate avalanche injection MOS memory (FAMOS memory), or a metal-oxide-nitride-oxide-silicon memory (MONOS memory). Specifically, the nonvolatile memory 50 is a flash memory capable of a collective erasing operation and the like. The flash memory is, for example, a flash ROM. The nonvolatile memory 50 includes storage areas such as a user storage area 52 for storing user information such as confidential information and a setting storage area 54 for storing protection setting information. The protection setting information is, for example, information on the access authority and the permission setting.

In the embodiment, access authority to the bus slaves is set for the plurality of master circuits 20-1 to 20-n. For example, access authority to the plurality of slave circuits 30-1 to 30-m that are the bus slaves is set for the plurality of master circuits 20-1 to 20-n. For example, access authority is set for each bus master that instructs access to an access target circuit such as a peripheral circuit or a memory. That is, presence or absence of access authority is set for the plurality of master circuits 20-1 to 20-n. Permission setting of read access or write access from the bus masters is performed for the plurality of slave circuits 30-1 to 30-m. For example, when a bus master having access authority performs read access or write access, permission setting of permitting the read access or write access or not is set for the plurality of slave circuits 30-1 to 30-m. The plurality of master circuits 20-1 to 20-n determine whether the plurality of slave circuits 30-1 to 30-m are accessible based on the access authority and the permission setting. For example, the plurality of master circuits 20-1 to 20-n determine whether the slave circuits are accessible based on the access authority set for the master circuits and the permission setting set for the plurality of slave circuits 30-1 to 30-m. For example, when a master circuit having access authority performs read access to a slave circuit, the read access is permitted when the permission setting of the read access is performed for the slave circuit. Further, when a master circuit having access authority performs write access to the slave circuit, the write access is permitted when the permission setting of the write access is performed for the slave circuit. When the permission setting of both the read access and the write access is performed for the slave circuit, both the read access and the write access of a master circuit having access authority are permitted.

For example, the user storage area 52 of the nonvolatile memory 50 stores important information such as confidential information of a user. For example, when the circuit device 10 is a microcomputer, the confidential information is information on an application program of the user executed on the microcomputer and various data. The confidential information is, for example, key information used for encryption processing. In this case, for example, a situation may occur in which an external device accesses the circuit device 10 and the important information such as confidential information is read by the outside. In the embodiment, in order to prevent the situation and protect information such as confidential information, a method for determining whether access from a master circuit to the slave circuit is permitted based on the access authority set for the master circuit and access permission setting set for the slave circuit is adopted. Information to be protected is not limited to the information stored in the nonvolatile memory 50, and may be information stored in another memory or the like of the circuit device 10.

Specifically, in the embodiment, the presence or absence of access authority is set for each master circuit that is the bus master. The permission setting of the read access or write access from the bus master is performed for each slave circuit that is the bus slave. When the master circuit performs read access or write access to the slave circuit, whether the read access or the write access is permitted is determined based on the access authority of the master circuit and the permission setting of the slave circuit. In this way, it is possible to finely set whether access to a circuit such as a peripheral circuit or a memory is permitted, and it is possible to freely set a balance between convenience and robustness of security according to a request of the user. For example, it is possible to respond to a request of a user who emphasizes the robustness of security by the user performing strict protection setting for the access authority and the access permission setting. Further, it is possible to respond to a request of a user who emphasizes the convenience by the user performing gentle protection setting for the access authority and the access permission setting. Accordingly, the circuit device 10 having an advanced protection function can be implemented.

For example, in the related art of JP-A-2019-160191 described above, a security state changes according to a command received from the outside, and whether the command can be executed is determined according to the state. In contrast, in the embodiment, the protection setting is performed by access authority setting for the master circuit in the circuit device 10 and access permission setting for the slave circuit in the circuit device 10. Therefore, it is possible to determine whether the access is permitted by only a combination of the access authority and the access permission setting, the master circuit, and the slave circuit without depending on the command, and thus flexible protection setting can be performed by simple setting.

For example, in the embodiment, the plurality of master circuits 20-1 to 20-n include a first master circuit for which the access authority to the bus slaves is set and a second master circuit for which no access authority to the bus slaves is set. For example, the first master circuit for which the access authority is set is, for example, a processor 22 or a DMA controller 26 in FIGS. 2 and 3 to be described later. The second master circuit for which no access authority is set is, for example, an external bus interface 28 or a debug circuit 24. The plurality of slave circuits 30-1 to 30-m include a first slave circuit for which first permission setting is performed. The first master circuit is permitted to perform read access or write access to the first slave circuit without depending on the first permission setting. That is, the first master circuit for which the access authority to the bus slaves is set is permitted to perform the read access or the write access to the first slave circuit regardless of whether the read access or the write access is permitted in the first permission setting of the first slave circuit. In contrast, the second master circuit is permitted to perform read access or write access to the first slave circuit based on the first permission setting. That is, the second master circuit for which no access authority to the bus slaves is set is permitted to perform the read access or the write access to the first slave circuit based on the first permission setting of the first slave circuit. For example, when the read access is permitted in the first permission setting, the second master circuit can perform the read access to the first slave circuit, and when the write access is permitted in the first permission setting, the second master circuit can perform the write access to the first slave circuit. In this way, it is possible to collectively perform permission setting of the read access and the write access from the first master circuit to the first slave circuit by setting the access authority. For the second master circuit for which no access authority is set, whether the read access and the write access are permitted is determined by the first permission setting for the first slave circuit. Therefore, it is possible to perform the flexible protection setting by the simple setting alone, and it is possible to appropriately set the balance between the convenience and the robustness of security according to the request of the user.

As shown in FIG. 1, the circuit device 10 of the embodiment includes the nonvolatile memory 50 that stores protection setting information that is information on the access authority and the permission setting. For example, the setting storage area 54 of the nonvolatile memory 50 stores the protection setting information that is information on the access authority and the permission setting. In this way, the protection setting information that is information on the access authority and the permission setting is stored in the nonvolatile memory 50 that retains information storage even when no electric power is supplied. Therefore, after the electric power is supplied to the circuit device 10, it is possible to perform access authority setting for the master circuit and the permission setting of the read access or the write access to the slave circuit based on the protection setting information stored in the nonvolatile memory 50. Therefore, it is possible to more reliably prevent a situation in which the information such as confidential information of the user is read out by the external device.

As shown in FIG. 1, the circuit device 10 of the embodiment includes the memory controller 40 that performs the access authority setting and the permission setting based on the protection setting information read from the nonvolatile memory 50. For example, in an initialization process after supplying the power, the memory controller 40 reads the protection setting information from the nonvolatile memory 50, and performs the access authority setting for the master circuit and the access permission setting for the slave circuit based on the read protection setting information. In this way, the memory controller 40 can be effectively used to perform the access authority setting for the master circuit and the access permission setting for the slave circuit. The memory controller 40 controls the nonvolatile memory 50 that stores the protection setting information. That is, the memory controller 40 can read the protection setting information, which is information on the access authority and the permission setting, from the nonvolatile memory 50 on which the memory controller 40 performs the read control, and execute the access authority setting for the master circuit and the access permission setting for the slave circuit based on the information on the access authority and the permission setting. Instead of storing the protection setting information that is information on the access authority and the permission setting in the non-volatile memory 50, the access authority may be fixedly given to the master circuit, and/or the access permission setting may be given to the slave circuit. For example, the access authority setting or the access permission setting may be performed by a fixed hardware circuit. Alternatively, information on the access authority setting and the access permission setting may be stored in a mask ROM other than the EEPROM.

The information on the permission setting is written to registers 31-1 to 31-m respectively provided in the slave circuits 30-1 to 30-m. For example, permission setting of read access or write access of the slave circuit 30-1 is written to the register 31-1 of the slave circuit 30-1. Similarly, permission setting of read access or write access of each of the slave circuits 30-2 to 30-m is written to each of the registers 31-2 to 31-m of the slave circuits 30-2 to 30-m. For example, in the initialization process after supplying the power or the like, the memory controller reads the protection setting information from the nonvolatile memory 50, and writes the information on the permission setting included in the protection setting information to the registers 31-1 to 31-m. In this way, the plurality of slave circuits 30-1 to 30-m can determine whether to permit the read access or the write access of the master circuit based on the information on the permission setting written in the registers 31-1 to 31-m of the slave circuits 30-1 to 30-m and the access authority of the master circuit. The registers 31-1 to 31-m can be implemented by, for example, a flip-flop circuit or a memory element.

The information on the access authority is included in bus access information on the bus 12. For example, the information on access authority is included in the bus access information when the master circuit accesses the slave circuit via the bus 12. For example, the bus access information includes the information on the access authority that is information on whether the bus access of the master circuit is a bus access having access authority. In this way, when read access or write access is received from the master circuit, the slave circuit can determine whether to permit the read access or the write access based on the information on the access authority included in the bus access information on the read access or the write access and the information on the access permission setting set for the slave circuit.

2. Detailed Configuration Example

Figure 2:
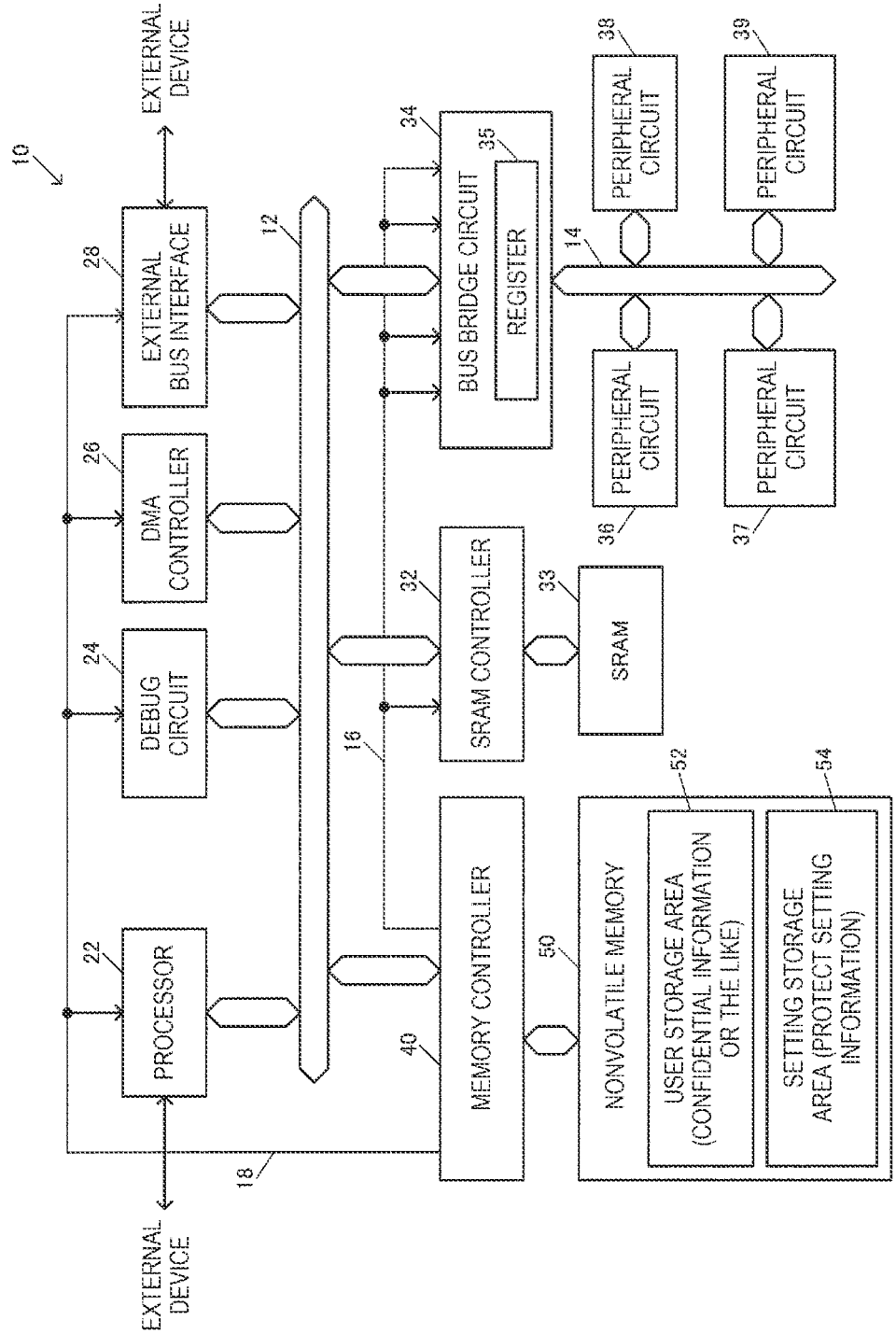
FIG. 2 shows a first detailed configuration example of the circuit device according to the embodiment.

FIG. 2 shows a first detailed configuration example of the circuit device 10 according to the embodiment. FIG. 2 shows a configuration example when the circuit device 10 of the embodiment is, for example, the microcomputer. In FIG. 2, the processor 22, the debug circuit 24, the DMA controller 26, and the external bus interface 28 are provided as the master circuits 20-1 to 20-n in FIG. 1. Further, the access authority is set for the processor 22, the debug circuit 24, the DMA controller 26, and the external bus interface 28. A SRAM controller 32, a bus bridge circuit 34, and the memory controller 40 are provided as the slave circuits 30-1 to 30-m in FIG. 1. Further, the access permission setting is performed on the SRAM controller 32, the bus bridge circuit 34, and the memory controller 40.

The processor 22 is, for example, a central processing unit (CPU), and is, for example, a circuit that fetches a command and executes the command. The processor is not limited to the CPU, and various processing circuits that execute commands such as programs can be assumed.

The debug circuit 24 performs debug processing of the circuit device 10 that is the microcomputer. For example, the debug circuit 24 performs debugging for confirming whether a program executed by the processor 22 executes a desired operation. The debug circuit 24 has a format such as a joint test action group (JTAG), a serial wire debug port (SWD), an embedded trace macrocell (ETM), and various operations and setting can be performed by coupling the debug circuit 24 to an external personal computer or the like via, for example, an in-circuit emulator (ICE).

The DMA controller 26 performs direct memory access (DMA) transfer. For example, the DMA controller 26 performs the DMA transfer in which data is directly transferred between a memory and a memory or a peripheral circuit without intervention of processing of the processor 22 that is the CPU. For example, the DMA controller 26 accesses the bus 12 according to a predetermined algorithm or the like to execute the DMA transfer.

The external bus interface 28 is a circuit that performs interface processing with an external bus of the circuit device 10. By providing the external bus interface 28, data can be transferred between the circuit device 10 and an external device coupled to the external bus. For example, by providing the external bus interface 28, data transfer such as DMA transfer can be performed between the circuit device 10 and a memory such as a ROM or a RAM coupled to the external bus or an external device such as an I/O device. The external bus interface 28 may be, for example, an Ethernet controller. For example, the Ethernet controller that is the external bus interface 28 includes circuits of a media access control layer (MAC) and a physical layer (PHY), and enables TCP/IP communication.

The SRAM controller 32 controls a SRAM 33. For example, the SRAM controller 32 performs read control and write control of the SRAM 33. The SRAM 33 is a memory that functions as a temporary storage area of a circuit such as the processor 22 of the circuit device 10.

The bus bridge circuit 34 is provided between the bus 12 that is a main bus and a peripheral bus 14 to which a plurality of peripheral circuits 36, 37, 38, and 39 are coupled. For example, the bus bridge circuit 34 converts bus access and performs communication between two buses having different protocols. That is, the bus bridge circuit 34 is provided between the bus 12 of a first protocol and the peripheral bus 14 of a second protocol, and performs protocol conversion and the like necessary for data transfer. For example, when the bus 12 is an advanced high-performance bus (AHB) and the peripheral bus 14 is an advanced peripheral bus (APB), the bus bridge circuit 34 performs protocol conversion between the AHB and the APB.

The peripheral circuits 36, 37, 38, and 39 are coupled to the peripheral bus 14. Examples of the peripheral circuits 36, 37, 38, and 39 include a timer circuit, a serial interface such as a universal asynchronous receiver/transmitter (UART) or a serial peripheral interface (SPI), a display driver such as a liquid crystal display driver, an A/D conversion circuit, a D/A conversion circuit, a digital filter, and a digital camera interface.

In FIG. 2, the memory controller 40 performs permission setting for the SRAM controller 32 and the bus bridge circuit 34, which are the plurality of slave circuits, by using a first signal line 16 provided separately from the bus 12. That is, the memory controller 40 performs permission setting of read access and write access to the SRAM controller 32 and the bus bridge circuit 34 by signal output to the dedicated first signal line 16. The first signal line 16 includes one or a plurality of signal lines, and can also be referred to as a first signal line group for permission setting. For example, the memory controller performs permission setting for each of the SRAM controller 32 and the bus bridge circuit 34, which are the slave circuits, by outputting a signal for permission setting to the first signal line 16 in the initialization process or the like. Specifically, the information on the permission setting is written to the register of each slave circuit. In this way, for example, in a period before the circuit device 10 performs processing of an actual operation, the memory controller 40 can perform the permission setting of the slave circuit using the dedicated first signal line 16. Accordingly, for example, when the circuit device 10 performs the actual operation, it is possible to prevent a situation in which the information such as confidential information is read or rewritten by malicious access from an external device.

In FIG. 2, the memory controller 40 sets access authority for the processor 22, the debug circuit 24, the DMA controller 26, and the external bus interface 28, which are the plurality of master circuits, by using a second signal line 18 provided separately from the bus 12. That is, the memory controller 40 sets the presence or absence of access authority for the processor 22, the debug circuit 24, the DMA controller 26, and the external bus interface 28 by outputting a signal to the dedicated second signal line 18. For example, the memory controller 40 sets authority for each of the processor 22, the debug circuit 24, the DMA controller 26, and the external bus interface 28, which are the master circuits, by outputting a signal for setting access authority to the second signal line 18 in the initialization process or the like. In this way, for example, in the period before the circuit device 10 performs the processing of the actual operation, the memory controller 40 can set the access authority of the master circuit using the dedicated second signal line 18. Accordingly, for example, when the circuit device 10 performs the actual operation, it is possible to prevent the situation in which the information such as confidential information is read or rewritten by the malicious access from the external device.

As shown in FIG. 2, the circuit device 10 includes the bus bridge circuit 34 provided between the bus 12 and the peripheral bus 14 to which the plurality of peripheral circuits 36 to 39 are coupled, and information on the permission setting on each peripheral circuit of the plurality of peripheral circuits 36 to 39 is written in a register 35 provided in the bus bridge circuit 34. For example, the memory controller 40 writes the information on the permission setting to the register 35 of the bus bridge circuit 34 by outputting a signal for permission setting to the first signal line 16 in the initialization process or the like. In this way, the access permission setting for the peripheral circuits 36 to 39 coupled to the peripheral bus 14 can be collectively performed using the register 35 of the bus bridge circuit 34, the processing of the access permission setting can be simplified, and processing load can be reduced. That is, when the access permission setting is individually performed on each of the peripheral circuits 36 to 39 coupled to the peripheral bus 14, problems such as complicated permission setting processing by the memory controller 40 and the like and heavy processing load may occur. Such a problem can be prevented when the permission setting is performed on the peripheral circuits 36 to 39 by writing the information on the permission setting to the register 35 of the bus bridge circuit 34. When the bus bridge circuit 34 is accessed by the master circuit, the bus bridge circuit 34 can collectively determine and process the permission setting for each of the plurality of peripheral circuits 36 to 39 based on the information on the permission setting written in the register 35. Accordingly, security performance can be improved, and the circuit device 10 having the advanced protection function can be implemented. It is possible to prevent inappropriate access such as transferring information stored in a memory such as the nonvolatile memory 50 or the SRAM 33 to the peripheral circuits 36 to 39 and outputting the information to the outside.

Figure 3:
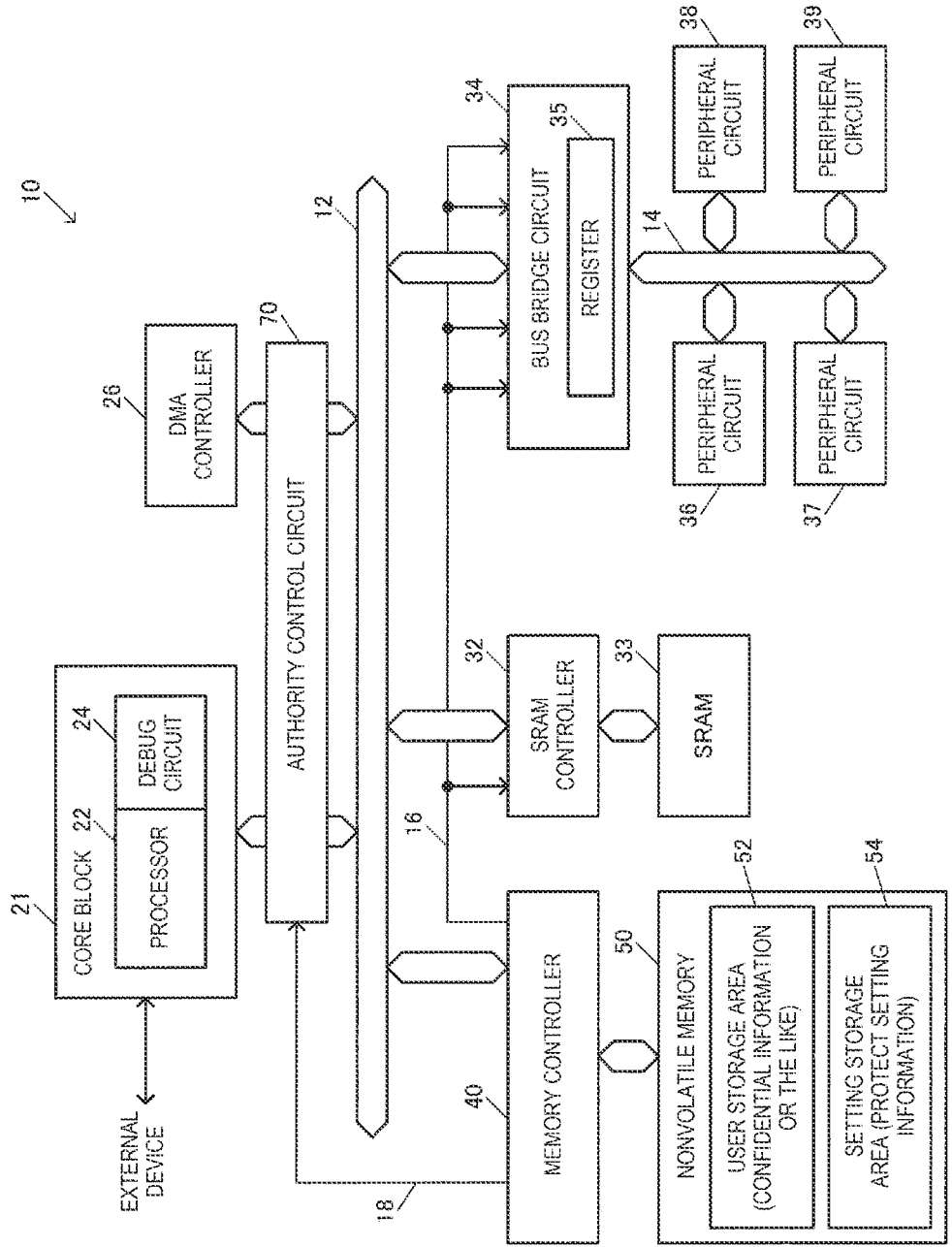
FIG. 3 shows a second detailed configuration example of the circuit device according to the embodiment.

FIG. 3 shows a second detailed configuration example of the circuit device 10 according to the embodiment. FIG. 3 also shows a configuration example when the circuit device 10 of the embodiment is, for example, a microcomputer. Parts different from those in FIG. 2 will be described.

In FIG. 3, the circuit device 10 includes an authority control circuit 70 provided between the bus 12 and the processor 22, the debug circuit 24, and the DMA controller 26 that are the plurality of master circuits. For example, the processor 22 and the debug circuit 24 are included in a core block 21. The authority control circuit 70 and the core block 21 are coupled by a first bus, and the authority control circuit 70 and the DMA controller 26 are coupled by a second bus. The authority control circuit 70 sets the access authority by rewriting the information on the access authority included in the bus access information from the processor 22, the debug circuit 24, and the DMA controller 26 that are the plurality of master circuits. For example, depending on an architecture of the CPU or the like, the access authority can be dynamically switched by issuing a command or the like. For example, the access authority is dynamically switched so that access authority given when processing of an operating system (OS) is executed is not given when an application program is executed. Therefore, the master circuit may set the access authority by itself and access the bus 12. In this case, the information on the access authority included in the bus access information is overwritten with the information on the access authority included in the protection setting information. In this way, even when the access authority is inappropriately set for the master circuit, the authority control circuit 70 rewrites the information on the access authority included in the bus access information from the master circuit, and thus appropriate access authority is set for the master circuit. Accordingly, it is possible to prevent the situation in which the information such as confidential information is read or rewritten by the malicious access from the external device.

In FIG. 3, the circuit device 10 includes the nonvolatile memory 50 that stores the protection setting information that is information on the access authority and the permission setting, and the memory controller 40 that controls the nonvolatile memory. The memory controller 40 sets the access authority for the authority control circuit 70. For example, the memory controller 40 reads the protection setting information from the nonvolatile memory 50, and transfers the information on the access authority included in the protection setting information to the authority control circuit 70 via, for example, the second signal line 18. The authority control circuit 70 rewrites the access authority setting set by the master circuit itself based on the information on the access authority included in the protection setting information. In this way, even when the access authority is inappropriately set for the master circuit, the memory controller 40 can read the protection setting information from the nonvolatile memory 50 and set the access authority for the authority control circuit 70. Accordingly, the authority control circuit 70 can rewrite the information on the access authority included in the bus access information from the master circuit and set appropriate access authority for the master circuit.

Also in FIG. 3, the memory controller 40 performs access permission setting for the SRAM controller 32 and the bus bridge circuit 34, which are the slave circuits, by using the first signal line 16.

Next, specific setting examples of the access authority and the access permission will be described with reference to FIGS. 4, 5, and 6. For example, FIG. 4 shows a setting example of the access authority, and the access authority is set to "YES" for the processor 22 and the DMA controller 26. On the other hand, for the debug circuit 24 and the external bus interface 28, the access authority is set to "NO", that is, the access authority is not set.

FIG. 5 shows an example of the access permission setting. For example, permission setting of read access and write access can be individually performed on each of memory storage areas AR1 to AR128 in the nonvolatile memory 50. For example, both the read access and the write access are set to be permitted in the memory storage areas AR1 and AR2, and both the read access and the write access are set to be prohibited in the memory storage area AR3. In the memory storage area AR128, the read access is set to be prohibited while the write access is set to be permitted. For example, for a memory storage area in which important information such as confidential information is stored, it is desirable to set the read access or the write access to be prohibited. For the SRAM 33 coupled to the SRAM controller 32, the read access is set to be permitted while the write access is set to be prohibited. In this way, it is possible to prevent a situation in which a master circuit having no access authority writes the information such as confidential information to the SRAM 33, transfers the information to the outside, and outputs the information. Permission and prohibition of the read access and the write access can be individually set for each memory storage area also in the SRAM 33. For peripheral circuits PA to PZ coupled to the bus bridge circuit 34, permission and prohibition of the read access and the write access are set according to each peripheral circuit.

FIG. 6 shows whether the read access or the write access is permitted when the access authority setting and the access permission setting as shown in FIGS. 4 and 5 are performed. For example, since the access authority of the processor 22 and the DMA controller 26 are set as shown in FIG. 4, the read access and the write access are possible for both the SRAM 33 and the peripheral circuits PA to PZ as shown in FIG. 6.

On the other hand, the access authority of the debug circuit 24 and the external bus interface 28 is not set, that is, the debug circuit 24 and the external bus interface 28 have no access authority. Therefore, whether the access of the debug circuit 24 and the external bus interface 28 is permitted is determined based on permission setting of an accessed slave circuit. For example, the access permission setting is performed on the SRAM 33 such that read access is permitted and the write access is prohibited. Therefore, the debug circuit 24 and the external bus interface 28 having no access authority are permitted to perform the read access to the SRAM 33, but are prohibited from the write access. Accordingly, for example, it is possible to prevent a situation in which the debug circuit 24 writes the information such as the confidential information to the SRAM 33, transfers the information to an external personal computer or the like, and reads the information. It is possible to prevent a situation in which the external bus interface 28 writes the information such as the confidential information to the SRAM 33, transfers the information to the external bus, and reads the information.

The access permission setting is performed on the peripheral circuit PA such that both the read access and the write access are permitted. Therefore, the debug circuit 24 and the external bus interface 28 having no access authority are permitted to perform both the read access and the write access to the peripheral circuit PA. For example, for a peripheral circuit that cannot output information such as confidential information to the outside, it is considered that no problem occurs much even when both the read access and the write access are permitted. The access permission setting is performed on the peripheral circuit PB such that the read access is prohibited and the write access is permitted. Therefore, the debug circuit 24 and the external bus interface 28 having no access authority are permitted to perform the write access to the peripheral circuit PB, and are prohibited from performing the read access. The access permission setting is performed on the peripheral circuit PC such that both the read access and the write access are prohibited. Therefore, the debug circuit 24 and the external bus interface 28 having no access authority are prohibited from both the read access and the write access to the peripheral circuit PC. For example, in an application example of the microcomputer or the like, a peripheral circuit that is not used by the user may be provided in the circuit device 10. By prohibiting both read access and write access to such a peripheral circuit, it is possible to prevent a situation in which a security hole is generated due to the unused peripheral circuit.

In this way, in FIGS. 4 to 6, the first master circuit to which the access authority to the bus slaves is set is the processor 22 or the DMA controller 26. Therefore, for example, when first permission setting of the access to the first slave circuit is performed, the processor 22 or the DMA controller 26, which is the first master circuit, is permitted to perform the read access and the write access to the first slave circuit without depending on the first permission setting of the first slave circuit. Therefore, the processor 22 and the DMA controller 26 can access the first slave circuit, read data, and write data. Accordingly, the processor 22 can appropriately perform command execution processing or the like, and can appropriately execute data transfer processing of the DMA controller 26.

In FIGS. 4 to 6, the second master circuit for which no access authority to the bus slaves is set is the debug circuit 24 or the external bus interface 28. Therefore, for example, when the first permission setting of the access to the first slave circuit is performed, the debug circuit 24 or the external bus interface 28, which is the second master circuit, is permitted to perform the read access or the write access to the first slave circuit based on the first permission setting. Therefore, for the debug circuit 24 and the external bus interface 28, the read access or the write access can be permitted or prohibited according to the first permission setting of the first slave circuit. Therefore, for example, it is possible to prevent the situation in which the information such as the confidential information is read or rewritten by the malicious access via the debug circuit 24 and the external bus interface 28.

In this way, according to the embodiment, as shown in FIGS. 4 to 6, it is possible to finely set whether the read access or the write access is permitted, and it is possible to freely set the balance between the convenience and the robustness of security according to the request of the user.

FIG. 7 shows an example of the bus access information. When the master circuit that is the bus master performs bus access to the bus 12, bus access information that is a packet having a configuration as shown in FIG. 7 is transmitted. The bus access information includes, for example, information such as an access type, an access address, a write/read instruction, write data, an access size, and access authority. When the master circuit transmits the bus access information in FIG. 7 and performs the read access or the write access, the slave circuit that is the bus slave determines whether to process the read access or the write access based on the information on the access authority included in the bus access information of FIG. 7 and the access permission setting of the slave circuit.

In this case, the processor 22 that is the CPU includes a command bus and a data bus, and as shown in FIG. 7, it is possible to distinguish between bus access from the command bus and the other bus access by the information on the access authority included in the bus access information. The other bus access is bus access by the data bus or another bus master. The access authority is always set for access by the command bus of the processor 22, and even in an area in which reading from the data bus is prohibited, the reading can be performed in order to execute a command. Therefore, the processor 22 can appropriately execute and process a command of a program using the command bus. In this way, it is possible to distinguish between the bus access from the command bus and the other bus access, thereby implementing both protection of a command code including a confidential algorithm and execution of the command.

3. Details of Processing

Next, details of the processing of the embodiment will be described. In the embodiment, processing described below is performed to protect the information such as the confidential information inside the nonvolatile memory 50 from the malicious access from the outside. First, as shown in a flowchart of FIG. 8, in the initialization process of the circuit device 10 including a power-on reset, the memory controller 40 reads the protection setting information written to the setting storage area 54 in the nonvolatile memory 50, sets the access authority for the master circuit, and performs the access permission setting for the slave circuit. As shown in a flowchart of FIG. 9, the protection setting information can be written to the setting storage area 54 only when the setting storage area 54 is completely erased, that is, when no protection setting is performed. For example, when the protection setting is performed, contents of the protection setting cannot be changed. As shown in a flowchart of FIG. 10, in order to cancel the protection setting, the information such as the confidential information needs to be erased simultaneously by collective erasing all areas of the nonvolatile memory 50. It is not permitted to leave only the information such as the confidential information by performing partial erasure only on the setting storage area 54. However, in an area in which the write access is permitted, the partial erasure can be performed since the protection setting is not changed.

Figure 8:
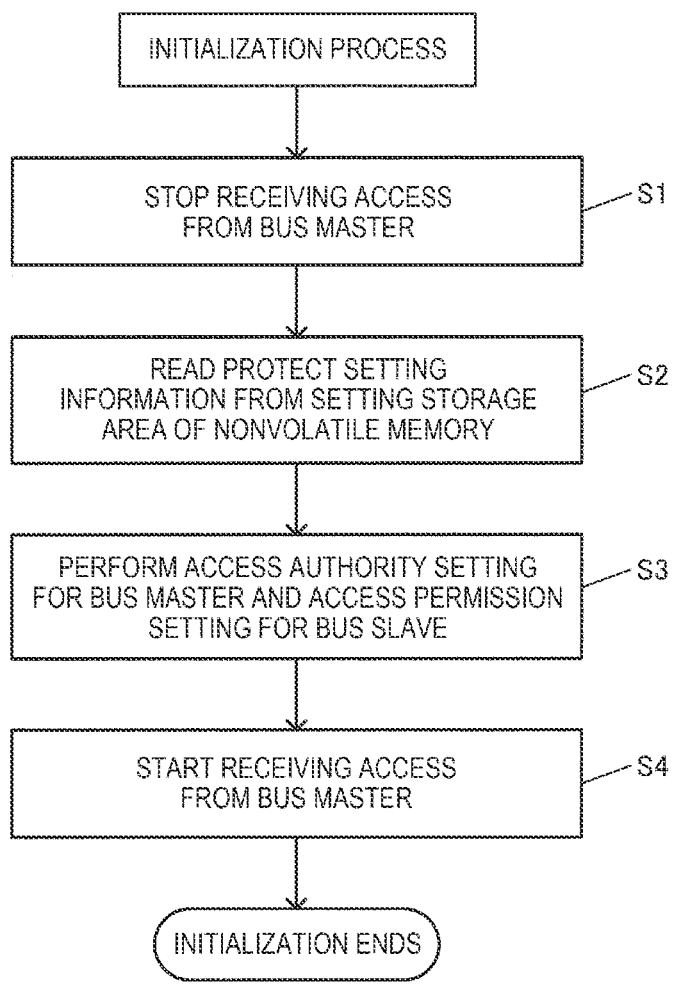
FIG. 8 shows a flowchart showing processing according to the embodiment.

Specifically, in the initialization process of FIG. 8, first, receiving of access from the bus master is stopped (step S1). The memory controller 40 reads the protection setting information from the setting storage area 54 of the nonvolatile memory 50 (step S2), and performs the access authority setting for the bus master and the access permission setting for the bus slave (step S3). Then, the receiving of the access from the bus master is started (step S4). In this way, in FIG. 8, in the initialization process, the memory controller 40 reads the protection setting information from the nonvolatile memory 50, and performs the access authority setting for the bus master and the access permission setting for the bus slave based on the read protection setting information. After the access authority setting and the access permission setting are performed, the bus access by the bus master is started, and the circuit device 10 can perform various processes in a state where advanced protection setting by the access authority setting and the access permission setting is performed.

Figure 9:
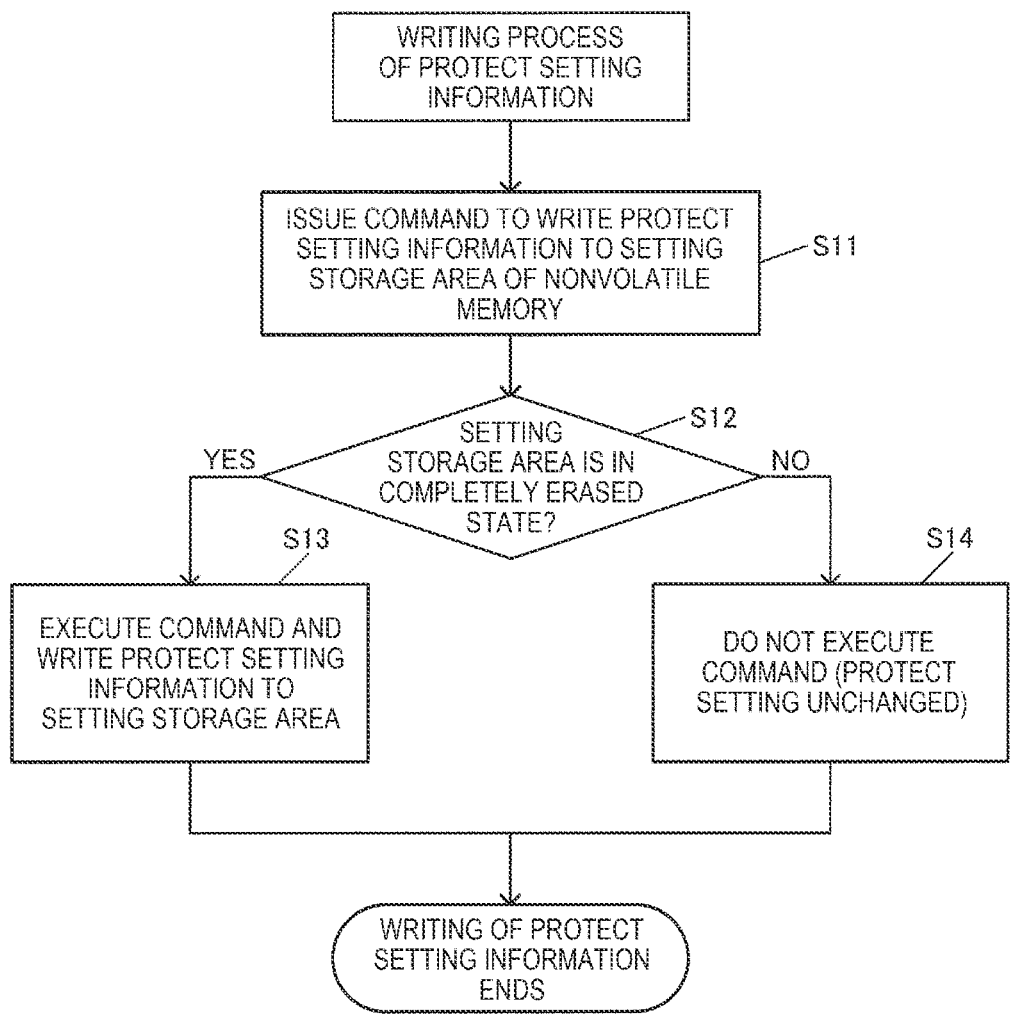
FIG. 9 shows a flowchart showing processing according to the embodiment.

In a writing process of the protection setting information in FIG. 9, when a command to write the protection setting information to the setting storage area 54 of the nonvolatile memory 50 is issued (step S11), the memory controller 40 determines whether the setting storage area 54 is in a completely erased state (step S12). When the setting storage area 54 is in the completely erased state, the memory controller 40 executes the issued command, writes the protection setting information to the setting storage area 54 (step S13), and ends writing of the protection setting information. In contrast, when the setting storage area 54 is not in the completely erased state, the memory controller 40 sets the protection setting unchanged without executing the command (step S14), and ends the writing of the protection setting information.

Figure 10:
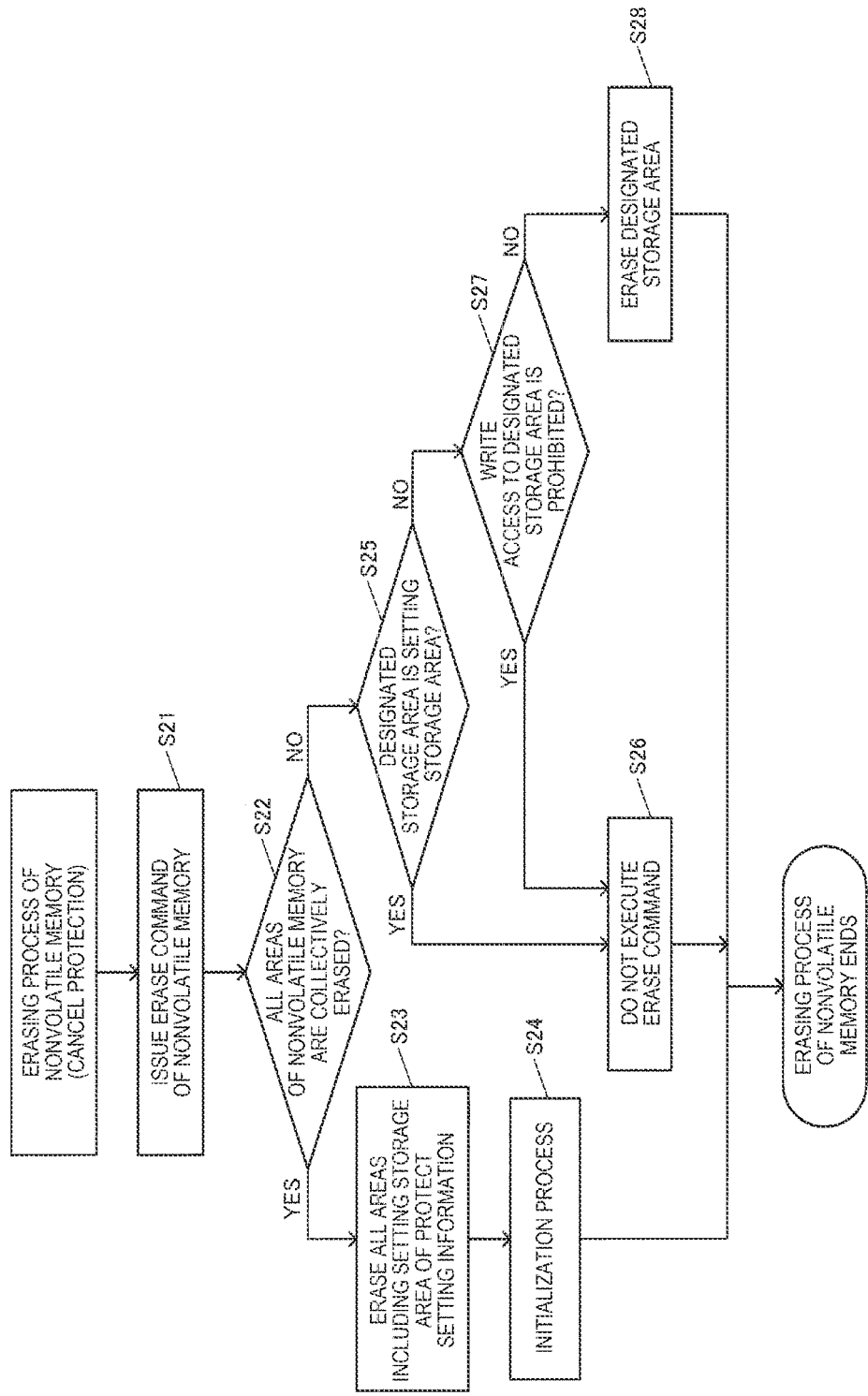
FIG. 10 shows a flowchart showing processing according to the embodiment.

In an erasing process of the nonvolatile memory 50 in FIG. 10, when an erase command of the nonvolatile memory 50 is issued (step S21), the memory controller 40 determines whether all areas of the nonvolatile memory 50 are collectively erased (step S22). When all areas are collectively erased, the memory controller 40 erases all areas including the setting storage area 54 of the protection setting information (step S23), proceeds to the initialization process (step S24), and ends the erasing process of the nonvolatile memory 50. In contrast, when all areas are not collectively erased, the memory controller 40 determines whether a designated storage area in the erasing process is the setting storage area 54 (step S25). When the designated storage area is the setting storage area 54, the memory controller 40 ends the erasing process of the nonvolatile memory 50 without executing the erase command (step S26). In contrast, when the designated storage area is not the setting storage area 54, the memory controller 40 determines whether write access to the designated storage area is prohibited (step S27). When the write access is prohibited, the memory controller 40 completes the erasing process of the nonvolatile memory 50 without executing the erase command (step S26). When the write access is not prohibited, the memory controller 40 erases the designated storage area, and ends the erasing process of the nonvolatile memory 50.

As described above, in the embodiment, the memory controller 40 permits writing of the protection setting information to the nonvolatile memory 50 when the setting storage area 54 of the protection setting information is completely erased. That is, as shown in step S11 of FIG. 9, when a command to write the protection setting information to the setting storage area 54 of the nonvolatile memory 50 is issued, the memory controller 40 determines whether the setting storage area 54 is in the completely erased state as shown in step S12. For example, when a bit of a memory cell in an erased state is "1", it is determined whether all bits of the setting storage area 54 are "1". As shown in step S14, when the setting storage area 54 is not in the completely erased state, the memory controller 40 does not execute a command to write the protection setting information to the setting storage area 54 of the nonvolatile memory 50, and prohibits the writing of the protection setting information. In this way, it is possible to prevent the situation in which the access authority setting or the access permission setting of the protection setting information is rewritten by, for example, the malicious access from the outside, and it is possible to implement the circuit device 10 having an advanced protect function.

In the embodiment, when the protection setting information is stored in the setting storage area 54, the memory controller 40 does not permit the partial erasure of the setting storage area 54. In order to unlock the protection setting, the information such as the confidential information needs to be erased simultaneously by collective erasing of all areas of the nonvolatile memory 50. For example, when the erase command of the nonvolatile memory 50 is issued in step S21 of FIG. 10, the memory controller 40 determines whether the issued command is a command to collectively erase all areas of the nonvolatile memory 50. When the issued command is the command to collectively erase all areas, the memory controller 40 erases all areas including the setting storage area 54 of the protection setting information. Accordingly, the information such as the confidential information stored in the user storage area 52 is also erased. In contrast, when the erase command is not the command to collectively erase all areas, as shown in step S25, the memory controller 40 determines whether the designated storage area of the erase command is the setting storage area 54 of the protection setting information. That is, it is determined whether the setting storage area 54 is partially erased. When the designated storage area of the erase command is the setting storage area 54 and the setting storage area 54 is partially erased, the memory controller 40 does not execute the erase command as shown in step S26. That is, when the protection setting information is stored in the setting storage area 54, the memory controller 40 does not permit the partial erasure of the setting storage area 54. In this way, it is possible to prevent a situation in which the protection setting is canceled by partially erasing the setting storage area 54 of the non-volatile memory 50. In order to cancel the protection setting by erasing the protection setting information of the setting storage area 54, all areas of the nonvolatile memory 50 needs to be collectively erased. By collectively erasing all areas, not only the protection setting information but also the information such as the confidential information is erased. Therefore, it is possible to prevent a situation in which the protection setting is canceled by the malicious access from the outside and the information such as the confidential information is read.

4. Electronic Apparatus

FIG. 11 shows a configuration example of an electronic apparatus 300 including the circuit device 10 of the embodiment. The electronic apparatus 300 may include the circuit device 10 of the embodiment, a display unit 310, a memory 320, an operation interface 330, and a communication interface 340. Specific examples of the electronic apparatus 300 include various electronic apparatuses such as a panel device such as a meter panel, an in-vehicle device such as a car navigation system, a sensor device including a sensor such as a gyro sensor or an acceleration sensor, a projector, a head-mounted display, a printing device, a portable information terminal, a portable game terminal, a robot, and an information processing device.

The circuit device 10 that is a processing device performs control processing of the electronic apparatus 300, various signal processing, and the like. The display unit 310 can be implemented by, for example, a liquid crystal panel or an organic EL panel. The display unit 310 may be a touch panel. The memory 320 stores data from, for example, the operation interface 330 or the communication interface 340, or functions as a work memory of the circuit device 10. The memory 320 can be implemented by a semiconductor memory such as a RAM or a ROM, or a magnetic storage device such as a hard disk drive. The operation interface 330 is a user interface that receives various operations from a user. For example, the operation interface 330 can be implemented by a button, a mouse, a keyboard, or a touch panel. The communication interface 340 is an interface for communicating image data and control data. A communication process of the communication interface 340 may be a wired communication process or a wireless communication process.

As described above, the circuit device of the embodiment includes a bus, a plurality of master circuits that are coupled to the bus and are bus masters in the bus, and a plurality of slave circuits that are coupled to the plurality of master circuits via the bus and are bus slaves in the bus. Access authority to the bus slaves is set for the plurality of master circuits, and permission setting of read access or write access from the bus masters is performed for the plurality of slave circuits. The plurality of master circuits determine whether the plurality of slave circuits are accessible based on the access authority and the permission setting.

According to the embodiment, the access authority is set for the master circuits that are bus masters. The permission setting of the read access or write access from the bus masters is performed for the slave circuits that are bus slaves. When the master circuits perform the read access or the write access to the slave circuits, whether the read access or the write access is permitted is determined based on the access authority of the master circuits and the permission setting of the slave circuits. In this way, it is possible to finely set whether the access to a circuit of the circuit device is permitted, and it is possible to freely set a balance between convenience and robustness of security according to a request of a user. Accordingly, the circuit device having an advanced protection function can be implemented.

In the embodiment, the plurality of master circuits may include a first master circuit for which the access authority to the bus slaves is set and a second master circuit for which no access authority to the bus slaves is set. The plurality of slave circuits may include a first slave circuit for which first permission setting is performed. The first master circuit may be permitted to perform the read access or the write access to the first slave circuit without depending on the first permission setting, and the second master circuit may be permitted to perform the read access or the write access to the first slave circuit based on the first permission setting.

In this way, it is possible to collectively perform permission setting of the read access and the write access from the first master circuit for the first slave circuit by setting the access authority. For the second master circuit for which no access authority is set, whether the read access and the write access are permitted is determined by the first permission setting for the first slave circuit.

In the embodiment, the first master circuit may be a processor or a DMA controller.

In this way, when the first permission setting of the access to the first slave circuit is performed, the processor or the DMA controller, which is the first master circuit, is permitted to perform the read access and the write access to the first slave circuit without depending on the first permission setting of the first slave circuit.

In the embodiment, the second master circuit may be an external bus interface or a debug circuit.

In this way, when the first permission setting of the access to the first slave circuit is performed, the debug circuit or the external bus interface, which is the second master circuit, is permitted to perform the read access and the write access to the first slave circuit based on the first permission setting.

In the embodiment, a nonvolatile memory configured to store protection setting information that is information on the access authority and the permission setting may be provided.

In this way, the protection setting information that is information on the access authority and the permission setting is stored in the nonvolatile memory. The nonvolatile memory retains information storage even when no electric power is supplied.

In the embodiment, a memory controller configured to perform access authority setting and the permission setting based on the protection setting information read from the nonvolatile memory may be provided.

In this way, the memory controller can be effectively used to perform the access authority setting for the master circuit and the access permission setting for the slave circuit. The memory controller controls the nonvolatile memory that stores the protection setting information.

In the embodiment, the memory controller may perform the permission setting for the plurality of slave circuits using a first signal line provided separately from the bus.

In this way, for example, in a period after an initialization process and before the circuit device performs an actual operation, the memory controller can perform the permission setting of the slave circuits using the dedicated first signal line.

In the embodiment, the memory controller may perform the access authority setting for the plurality of master circuits using a second signal line provided separately from the bus.

In this way, for example, in a period after an initialization process and before the circuit device performs an actual operation, the memory controller can set the access authority of the master circuits using the dedicated second signal line.

Further, in the embodiment, an authority control circuit provided between the plurality of master circuits and the bus may be provided. The authority control circuit may set the access authority by rewriting information on the access authority included in bus access information from the plurality of master circuits.

In this way, even when the access authority is inappropriately set for the master circuits, the authority control circuit rewrites the information on the access authority included in the bus access information from the master circuits, and thus appropriate access authority is set for the master circuits.

In the embodiment, a nonvolatile memory configured to store protection setting information that is information on the access authority and the permission setting and a memory controller configured to control the nonvolatile memory may be provided. The memory controller may set the access authority to the authority control circuit.

In this way, even when the access authority is inappropriately set for the master circuits, the memory controller reads the protection setting information from the nonvolatile memory and sets the access authority to the authority control circuit. Thus, the authority control circuit can rewrite the information on the access authority included in the bus access information from the master circuits, and the appropriate access authority is set for the master circuits.

In the embodiment, the memory controller may permit writing of the protection setting information to the nonvolatile memory when a setting storage area of the protection setting information is completely erased.

In this way, when the setting storage area is not in the completely erased state, the writing of the protection setting information to the setting storage area is prohibited, and it is possible to prevent a situation in which the access authority setting or the access permission setting of the protection setting information is rewritten by, for example, malicious access from the outside.

In the embodiment, the memory controller may not permit partial erasure of the setting storage area when the protection setting information is stored in the setting storage area.

In this way, it is possible to prevent a situation in which protection setting is canceled by partially erasing the setting storage area.

In the embodiment, information on the permission setting may be written to a register provided in each of the plurality of slave circuits.

In this way, each slave circuit can determine whether to permit the read access or the write access of the master circuits based on the information on the permission setting written in the register of the slave circuit and the access authority of the master circuits.

In the embodiment, information on the access authority may be included in bus access information on the bus.

In this way, when the read access or the write access is received from the master circuits, the slave circuits can determine whether to permit the read access or the write access based on the information on access authority included in the bus access information of the read access or the write access and information on the access permission setting set for the slave circuits.

In the embodiment, a bus bridge circuit provided between the bus and a peripheral bus to which a plurality of peripheral circuits are coupled may be provided, and information on the permission setting for each of the plurality of peripheral circuits may be written in a register provided in the bus bridge circuit.

In this way, access permission setting for the peripheral circuits coupled to the peripheral bus can be collectively performed using the register of the bus bridge circuit, the processing of the access permission setting can be simplified, and processing load can be reduced.

The embodiment relates to an electronic apparatus including the circuit device described above.

Although the embodiment is described in detail above, it will be easily understood by those skilled in the art that many modifications can be made without substantially departing from novel matters and effects of the present disclosure. Therefore, all such modifications are intended to be included within the scope of the present disclosure. For example, a term cited with a different term having a broader meaning or the same meaning at least once in the description or in the drawings can be replaced with the different term in any place in the description or in the drawings. All combinations of the embodiment and the modifications are also included in the scope of the present disclosure. The configurations, operations, and the like of the circuit device and the electronic apparatus are not limited to those described in the embodiment, and various modifications can be made.

What is claimed is:

1. A circuit device comprising:
    a bus;
    a plurality of master circuits that are coupled to the bus and are bus masters in the bus; and
    a plurality of slave circuits that are coupled to the plurality of master circuits via the bus and are bus slaves in the bus, wherein
    access authority to the bus slaves is set for the plurality of master circuits,
    permission setting of read access or write access from the bus masters is performed for the plurality of slave circuits, and
    the plurality of master circuits determine whether the plurality of slave circuits are accessible based on the access authority and the permission setting.

2. The circuit device according to claim 1, wherein
    the plurality of master circuits include a first master circuit for which the access authority to the bus slaves is set and a second master circuit for which no access authority to the bus slaves is set,
    the plurality of slave circuits include a first slave circuit for which first permission setting is performed,
    the first master circuit is permitted to perform the read access or the write access to the first slave circuit without depending on the first permission setting, and
    the second master circuit is permitted to perform the read access or the write access to the first slave circuit based on the first permission setting.

3. The circuit device according to claim 2, wherein the first master circuit is a processor or a DMA controller.

4. The circuit device according to claim 2, wherein the second master circuit is an external bus interface or a debug circuit.

5. The circuit device according to claim 1, further comprising:
    a nonvolatile memory configured to store protection setting information that is information on the access authority and the permission setting.

6. The circuit device according to claim 5, further comprising:
    a memory controller configured to perform access authority setting and the permission setting based on the protection setting information read from the nonvolatile memory.

7. The circuit device according to claim 6, wherein
    the memory controller performs the permission setting for the plurality of slave circuits using a first signal line provided separately from the bus.

8. The circuit device according to claim 6, wherein
    the memory controller performs the access authority setting for the plurality of master circuits using a second signal line provided separately from the bus.

9. The circuit device according to claim 1, further comprising:
    an authority control circuit provided between the plurality of master circuits and the bus, wherein
    the authority control circuit sets the access authority by rewriting information on the access authority included in bus access information from the plurality of master circuits.

10. The circuit device according to claim 9, further comprising:
    a nonvolatile memory configured to store protection setting information that is information on the access authority and the permission setting; and
    a memory controller configured to control the nonvolatile memory, wherein
    the memory controller sets the access authority to the authority control circuit.

11. The circuit device according to claim 6, wherein
    the memory controller permits writing of the protection setting information to the nonvolatile memory when a setting storage area of the protection setting information is completely erased.

12. The circuit device according to claim 11, wherein
    the memory controller does not permit partial erasure of the setting storage area when the protection setting information is stored in the setting storage area.

13. The circuit device according to claim 1, wherein
    information on the permission setting is written to a register provided in each of the plurality of slave circuits.

14. The circuit device according to claim 1, wherein
    information on the access authority is included in bus access information on the bus.

15. The circuit device according to claim 1, further comprising:
    a bus bridge circuit provided between the bus and a peripheral bus to which a plurality of peripheral circuits are coupled, wherein
    information on the permission setting for each of the plurality of peripheral circuits is written in a register provided in the bus bridge circuit.

16. An electronic apparatus comprising:
    the circuit device according to claim 1.

* * * * *